(12) United States Patent
Seol et al.

(10) Patent No.: US 11,949,942 B2
(45) Date of Patent: Apr. 2, 2024

(54) DISPLAY DEVICE

(71) Applicant: LG ELECTRONICS INC., Seoul (KR)

(72) Inventors: Seongwoon Seol, Seoul (KR); Obong An, Seoul (KR); Eunyoung Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 13 days.

(21) Appl. No.: 17/812,422

(22) Filed: Jul. 13, 2022

(65) Prior Publication Data
US 2023/0300402 A1    Sep. 21, 2023

(30) Foreign Application Priority Data

Mar. 17, 2022 (WO) ................ PCT/KR2022/003720

(51) Int. Cl.
*H04N 21/431* (2011.01)
*H04N 21/439* (2011.01)

(52) U.S. Cl.
CPC ..... *H04N 21/4316* (2013.01); *H04N 21/4394* (2013.01)

(58) Field of Classification Search
CPC ......... H04N 21/44008; H04N 21/4394; H04N 21/4396; H04N 21/42646; H04N 5/85; H04N 9/8042; H04N 21/44222; H04N 21/6582; H04N 5/775; H04N 21/23418; H04N 21/426; H04N 21/44213; H04N 5/783; H04N 9/8205; H04N 21/2368; H04N 21/42204

See application file for complete search history.

(56) References Cited

U.S. PATENT DOCUMENTS

2019/0394525 A1* 12/2019 Choi ................ H04N 5/147

FOREIGN PATENT DOCUMENTS

| JP | 4615166 | 1/2011 |
| JP | 2021132281 | 9/2021 |
| KR | 1020160085076 | 7/2016 |
| KR | 101939296 | 1/2019 |
| KR | 102086870 | 3/2020 |

OTHER PUBLICATIONS

PCT International Application No. PCT/KR2022/003720, International Search Report dated Dec. 16, 2022, 5 pages.

* cited by examiner

*Primary Examiner* — Samira Monshi
(74) *Attorney, Agent, or Firm* — LEE, HONG, DEGERMAN, KANG & WAIMEY

(57) ABSTRACT

According to an embodiment, a display device includes a display, a network interface configured to communicate with an external server, and a controller configured to capture audio content during playback of Audio/Video (A/V) content, acquire a first content identifier based on the captured audio content, display a first pop-up window corresponding to the acquired first content identifier on the display, when a mute interval is continued for a predetermined time, capture video content, acquire a second content identifier based on captured video content, and, when the acquired second content identifier is not identical to the first content identifier, display a second pop-up window corresponding to the second content identifier on the display.

15 Claims, 9 Drawing Sheets

DISPLAY DEVICE

CROSS-REFERENCE TO RELATED APPLICATIONS

Pursuant to 35 U.S.C. § 119, this application claims the benefit of an earlier filing date and right of priority to International Application No. PCT/KR2022/003720, filed on Mar. 17, 2022, the contents of which are hereby incorporated by reference herein in its entirety.

BACKGROUND OF THE INVENTION

1. Field of the Invention

The present disclosure relates to a display device.

2. Discussion of the Related Art

With the development of digital broadcasting, broadcasting stations transmit enhanced service data, which can be used in conjunction with main audio/video content or is independent of the main audio/video content, together while transmitting the main audio/video content.

To this end, Auto Content Recognition (hereinafter, referred to as ACR) technology for recognizing audio/video content has emerged.

The ACR technology includes video recognition-based video ACR technology and audio recognition-based audio ACR technology.

In general, the video ACR technology captures and hashes multiple video frames in a short time and transfers them to an ACR server, resulting in expensive cost more than that of audio ACR technology.

In addition, the video ACR technology requires the number of transmissions of captured video to the ACR server after video capture more than that of the audio ACR technology.

In addition, the video ACR technology has a problem in that the video ACR technology cannot support a simultaneous image capture function because the video-based ACR function is deactivated due to limitations in a video decoder when reverse mirroring (TV images are periodically captured and transmitted to an external device) is performed.

Accordingly, the audio ACR technology has many advantages in that costs required for content recognition are reduced compared to the video ACR technology, and audio capture has no limitation in the simultaneous capture function.

According to the application of the ACR function, a display device adopts a policy to expose one enhanced service (auto pop-up window or nudge) per one A/V content.

That is, the pop-up window is exposed only when a content identifier is changed.

However, in the case of using the audio ACR technology, there is a problem in that two pop-up windows are exposed because two pieces of content are recognized when the A/V content is not changed but there is a mute interval.

SUMMARY OF THE INVENTION

An object of the present disclosure is to prevent a new pop-up window from being exposed when there is no change in A/V content even when a mute interval occurs when audio-based ACR technology is applied.

An object of the present disclosure is to maintain a content identifier without resetting the content identifier when there is no change in A/V content even when a mute interval occurs when audio-based ACR technology is applied.

According to an aspect of the present disclosure, a display device includes a display, a network interface configured to communicate with an external server, and a controller configured to capture audio content during playback of Audio/Video (A/V) content, acquire a first content identifier based on the captured audio content, display a first pop-up window corresponding to the acquired first content identifier on the display, when a mute interval is continued for a predetermined time, capture video content, acquire a second content identifier based on captured video content, and, when the acquired second content identifier is not identical to the first content identifier, display a second pop-up window corresponding to the second content identifier on the display.

According to the embodiments of the present disclosure, it is possible to prevent a new pop-up window from being exposed even when a mute interval is continued for a predetermined time, using the video-based ACR method.

Accordingly, when viewing A/V content, a user may not feel inconvenience of viewing, which is caused by several exposes of a pop-up window.

Further, it is possible to relatively reduce costs compared to the video-based ACR technology by basically using the audio ACR technology and remove limitations in the simultaneous image capture function.

DETAILED DESCRIPTION OF THE PREFERRED EMBODIMENTS

Hereinafter, embodiments of the present disclosure will be described in detail with reference to the drawings. The suffixes "module" and "unit or portion" for components used in the following description are merely provided only for facilitation of preparing this specification, and thus they are not granted a specific meaning or function.

The display device according to an embodiment of the present disclosure is, for example, an intelligent display device in which a computer support function is added to a broadcast reception function, and is faithful to a broadcast reception function and has an Internet function added thereto, such as a handwritten input device, a touch screen. Alternatively, a more user-friendly interface such as a spatial remote control may be provided. In addition, it is connected to the Internet and a computer with the support of a wired or wireless Internet function, so that functions such as e-mail, web browsing, banking, or games can also be performed. A standardized general-purpose OS may be used for these various functions.

Accordingly, in the display device described in the present disclosure, various user-friendly functions can be performed because various applications can be freely added or deleted, for example, on a general-purpose OS kernel. More specifically, the display device may be, for example, a network TV, HBBTV, smart TV, LED TV, OLED TV, and the like, and may be applied to a smart phone in some cases.

Figure 1:
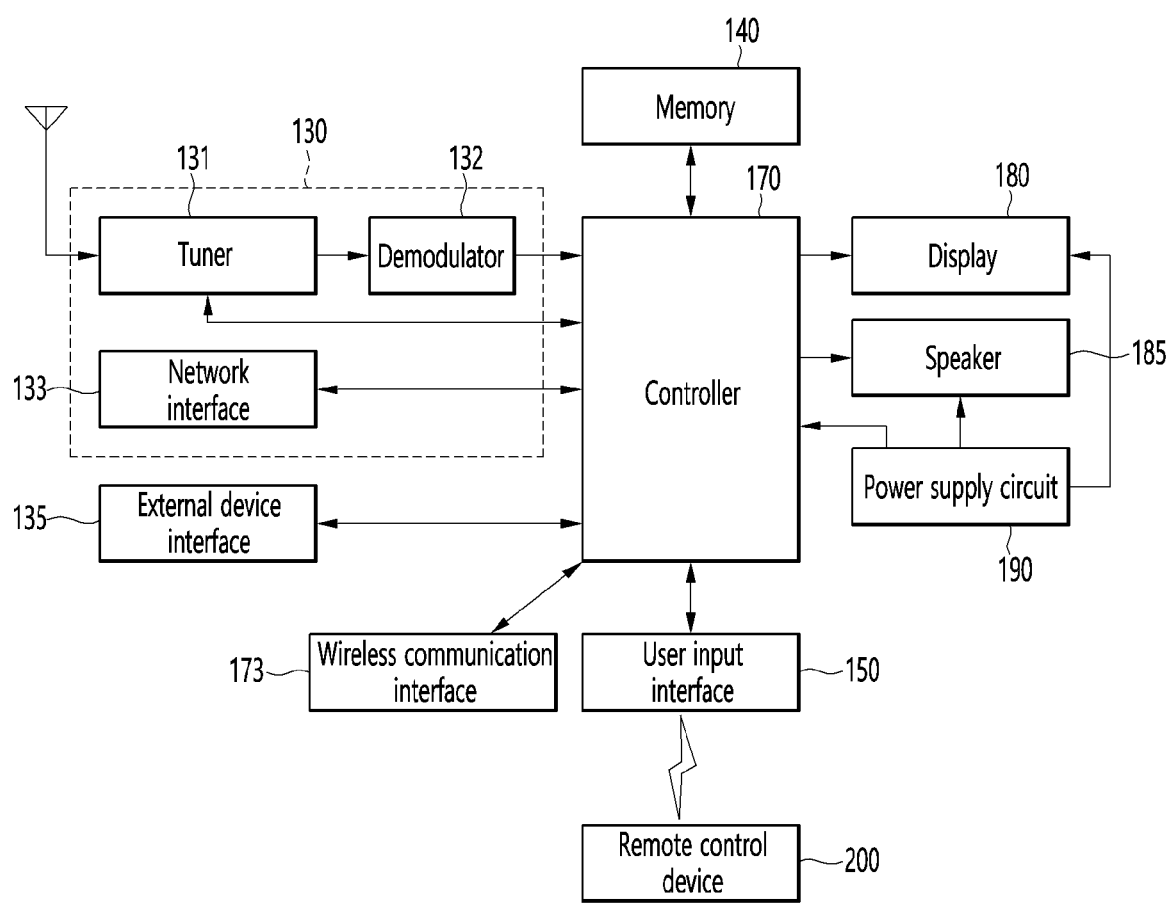
FIG. 1 is a block diagram illustrating a configuration of a display device according to an embodiment of the present disclosure.

FIG. 1 is a block diagram showing a configuration of a display device according to an embodiment of the present disclosure.

Referring to FIG. 1, a display device 100 may include a broadcast receiver 130, an external device interface 135, a memory 140, a user input interface 150, a controller 170, a wireless communication interface 173, a display 180, a speaker 185, and a power supply circuit 190.

The broadcast receiver 130 may include a tuner 131, a demodulator 132, and a network interface 133.

The tuner 131 may select a specific broadcast channel according to a channel selection command. The tuner 131 may receive a broadcast signal for the selected specific broadcast channel.

The demodulator 132 may separate the received broadcast signal into an image signal, an audio signal, and a data signal related to a broadcast program, and restore the separated image signal, audio signal, and data signal to a format capable of being output.

The external device interface 135 may receive an application or a list of applications in an external device adjacent thereto, and transmit the same to the controller 170 or the memory 140.

The external device interface 135 may provide a connection path between the display device 100 and an external device. The external device interface 135 may receive one or more of images and audio output from an external device connected to the display device 100 in a wired or wireless manner, and transmit the same to the controller 170. The external device interface 135 may include a plurality of external input terminals. The plurality of external input terminals may include an RGB terminal, one or more High Definition Multimedia Interface (HDMI) terminals, and a component terminal.

The image signal of the external device input through the external device interface 135 may be output through the display 180. The audio signal of the external device input through the external device interface 135 may be output through the speaker 185.

The external device connectable to the external device interface 135 may be any one of a set-top box, a Blu-ray player, a DVD player, a game machine, a sound bar, a smartphone, a PC, a USB memory, and a home theater, but this is only an example.

The network interface 133 may provide an interface for connecting the display device 100 to a wired/wireless network including an Internet network. The network interface 133 may transmit or receive data to or from other users or other electronic devices through a connected network or another network linked to the connected network.

In addition, a part of content data stored in the display device 100 may be transmitted to a selected user among a selected user or a selected electronic device among other users or other electronic devices registered in advance in the display device 100.

The network interface 133 may access a predetermined web page through the connected network or the other network linked to the connected network. That is, it is possible to access a predetermined web page through a network, and transmit or receive data to or from a corresponding server.

In addition, the network interface 133 may receive content or data provided by a content provider or a network operator. That is, the network interface 133 may receive content such as movies, advertisements, games, VOD, and broadcast signals and information related thereto provided from a content provider or a network provider through a network.

In addition, the network interface 133 may receive update information and update files of firmware provided by the network operator, and may transmit data to an Internet or content provider or a network operator.

The network interface 133 may select and receive a desired application from among applications that are open to the public through a network.

The memory 140 may store programs for signal processing and control of the controller 170, and may store images, audio, or data signals, which have been subjected to signal-processed.

In addition, the memory 140 may perform a function for temporarily storing images, audio, or data signals input from an external device interface 135 or the network interface 133, and store information on a predetermined image through a channel storage function.

The memory 140 may store an application or a list of applications input from the external device interface 135 or the network interface 133.

The display device 100 may play back a content file (a moving image file, a still image file, a music file, a document file, an application file, or the like) stored in the memory 140 and provide the same to the user.

The user input interface 150 may transmit a signal input by the user to the controller 170 or a signal from the controller 170 to the user. For example, the user input interface 150 may receive and process a control signal such as power on/off, channel selection, screen settings, and the like from the remote control device 200 in accordance with various communication methods, such as a Bluetooth communication method, a WB (Ultra Wideband) communication method, a ZigBee communication method, an RF (Radio Frequency) communication method, or an infrared (IR) communication method or may perform processing to transmit the control signal from the controller 170 to the remote control device 200.

In addition, the user input interface 150 may transmit a control signal input from a local key (not shown) such as a power key, a channel key, a volume key, and a setting value to the controller 170.

The image signal image-processed by the controller 170 may be input to the display 180 and displayed as an image corresponding to a corresponding image signal. Also, the image signal image-processed by the controller 170 may be input to an external output device through the external device interface 135.

The audio signal processed by the controller 170 may be output to the speaker 185. Also, the audio signal processed by the controller 170 may be input to the external output device through the external device interface 135.

In addition, the controller 170 may control the overall operation of the display device 100.

In addition, the controller 170 may control the display device 100 by a user command input through the user input interface 150 or an internal program and connect to a network to download an application a list of applications or applications desired by the user to the display device 100.

The controller 170 may allow the channel information or the like selected by the user to be output through the display 180 or the speaker 185 along with the processed image or audio signal.

In addition, the controller 170 may output an image signal or an audio signal through the display 180 or the speaker 185, according to a command for playing back an image of an external device through the user input interface 150, the image signal or the audio signal being input from an external device, for example, a camera or a camcorder, through the external device interface 135.

Meanwhile, the controller 170 may allow the display 180 to display an image, for example, allow a broadcast image which is input through the tuner 131 or an external input image which is input through the external device interface 135, an image which is input through the network interface or an image which is stored in the memory 140 to be displayed on the display 180. In this case, an image being displayed on the display 180 may be a still image or a moving image, and may be a 2D image or a 3D image.

In addition, the controller 170 may allow content stored in the display device 100, received broadcast content, or external input content input from the outside to be played back, and the content may have various forms such as a broadcast image, an external input image, an audio file, still images, accessed web screens, and document files.

The wireless communication interface 173 may communicate with an external device through wired or wireless communication. The wireless communication interface 173 may perform short range communication with an external device. To this end, the wireless communication interface 173 may support short range communication using at least one of Bluetooth™, Radio Frequency Identification (RFID), Infrared Data Association (IrDA), Ultra Wideband (UWB), ZigBee, Near Field Communication (NFC), Wi-Fi (Wireless-Fidelity), Wi-Fi (Wireless-Fidelity), Wi-Fi Direct, and Wireless USB (Wireless Universal Serial Bus) technologies. The wireless communication interface 173 may support wireless communication between the display device 100 and a wireless communication system, between the display device 100 and another display device 100, or between the display device 100 and a network in which the display device 100 (or an external server) is located through wireless area networks. The wireless area networks may be wireless personal area networks.

Here, the another display device 100 may be a wearable device (e.g., a smartwatch, smart glasses or a head mounted display (HMD), a mobile terminal such as a smart phone, which is able to exchange data (or interwork) with the display device 100 according to the present disclosure. The wireless communication interface 173 may detect (or recognize) a wearable device capable of communication around the display device 100.

Furthermore, when the detected wearable device is an authenticated device to communicate with the display device 100 according to the present disclosure, the controller 170 may transmit at least a portion of data processed by the display device 100 to the wearable device through the wireless communication interface 173. Therefore, a user of the wearable device may use data processed by the display device 100 through the wearable device.

The display 180 may convert image signals, data signals, and OSD signals processed by the controller 170, or image signals or data signals received from the external device interface 135 into R, G, and B signals, and generate drive signals.

Meanwhile, since the display device 100 shown in FIG. 1 is only an embodiment of the present disclosure, some of the illustrated components may be integrated, added, or omitted depending on the specification of the display device 100 that is actually implemented.

That is, two or more components may be combined into one component, or one component may be divided into two or more components as necessary. In addition, a function performed in each block is for describing an embodiment of the present disclosure, and its specific operation or device does not limit the scope of the present disclosure.

According to another embodiment of the present disclosure, unlike the display device 100 shown in FIG. 1, the display device 100 may receive an image through the network interface 133 or the external device interface 135 without a tuner 131 and a demodulator 132 and play back the same.

For example, the display device 100 may be divided into an image processing device, such as a set-top box, for receiving broadcast signals or content according to various network services, and a content playback device that plays back content input from the image processing device.

In this case, an operation method of the display device according to an embodiment of the present disclosure will be described below may be implemented by not only the display device 100 as described with reference to FIG. 1 and but also one of an image processing device such as the separated set-top box and a content playback device including the display 180 and the speaker 185.

Next, a remote control device according to an embodiment of the present disclosure will be described with reference to FIGS. 2 to 3.

Figure 2:
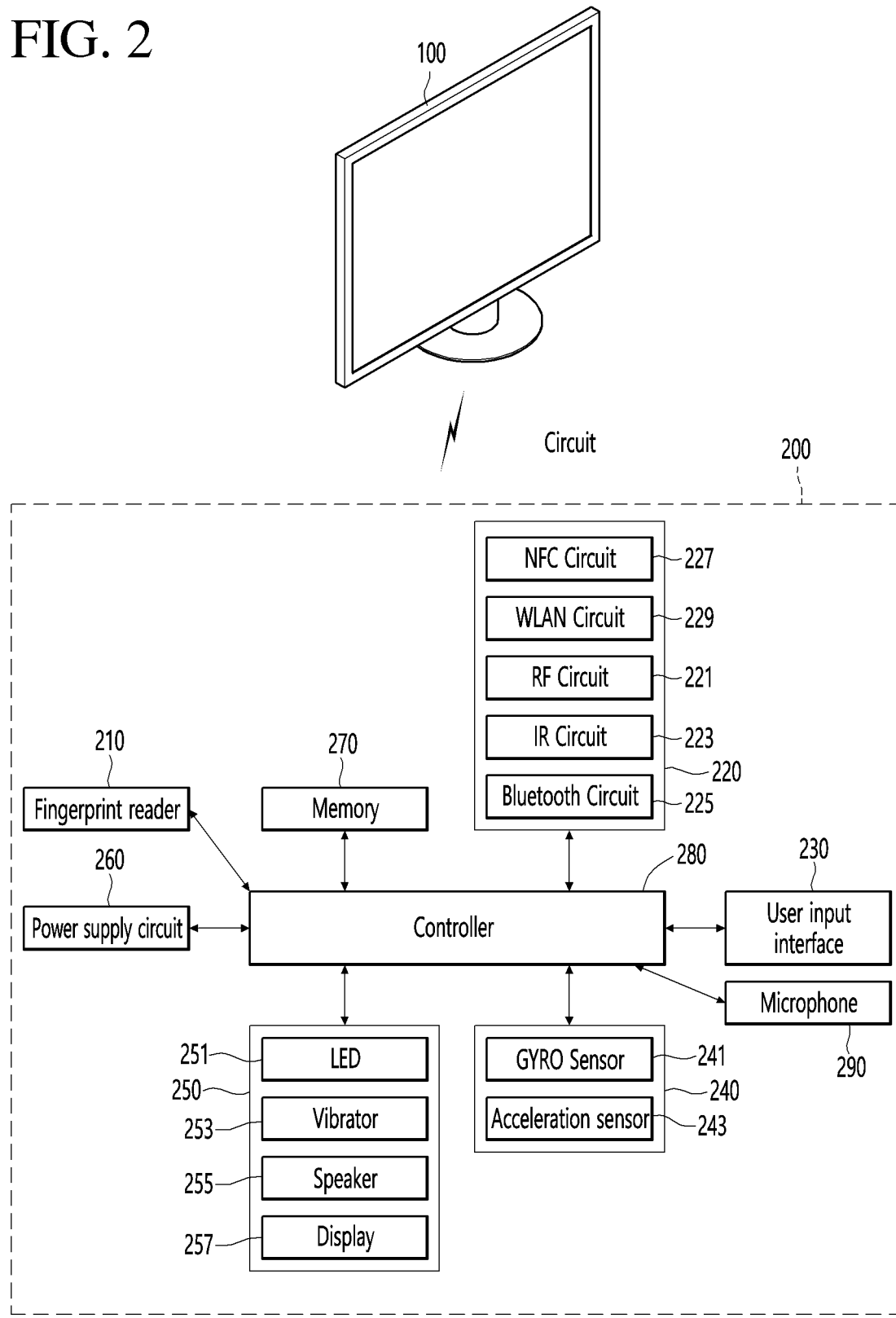
FIG. 2 is a block diagram of a remote control device according to an embodiment of the present disclosure.
Figure 3:
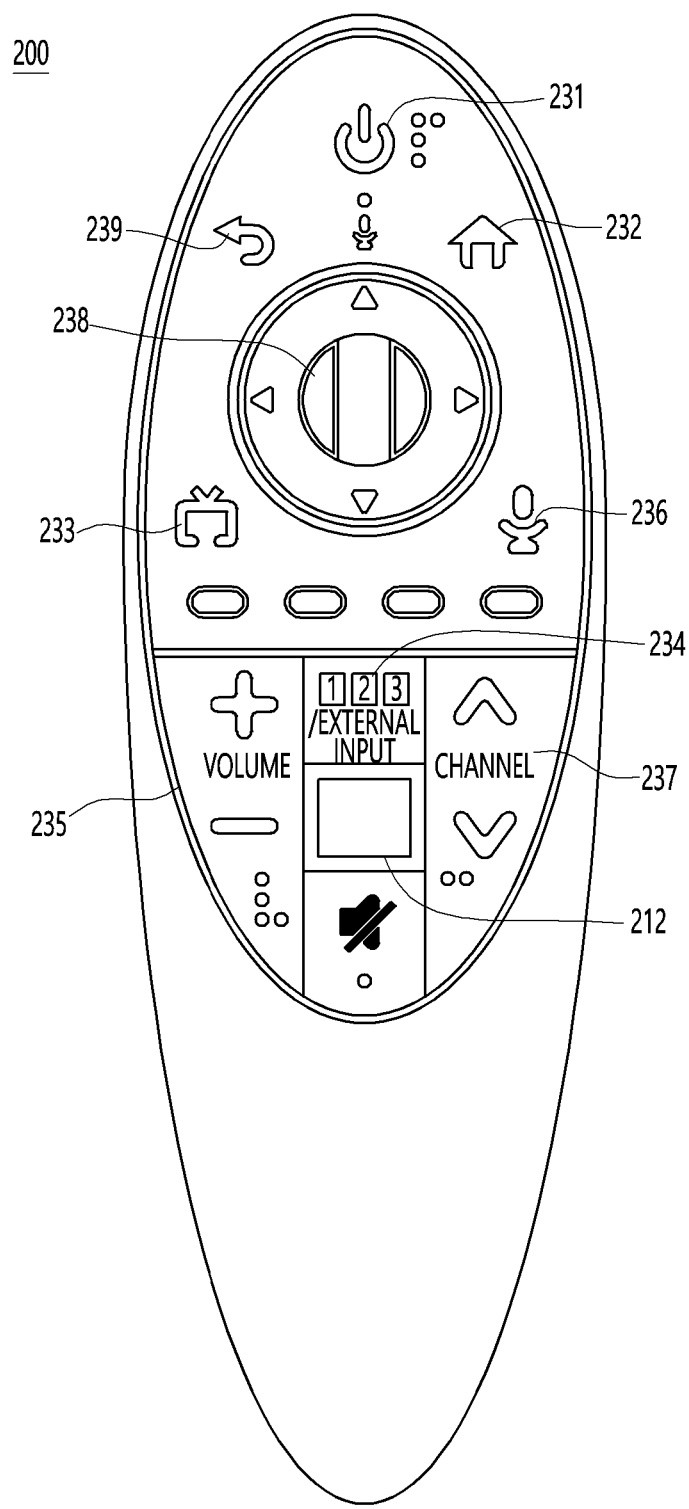
FIG. 3 shows an example of an actual configuration of a remote control device according to an embodiment of the present disclosure.

FIG. 2 is a block diagram of a remote control device according to an embodiment of the present disclosure, and FIG. 3 shows an actual configuration example of a remote control device 200 according to an embodiment of the present disclosure.

First, referring to FIG. 2, the remote control device 200 may include a fingerprint reader 210, a wireless communication circuit 220, a user input interface 230, a sensor 240, an output interface 250, a power supply circuit 260, a memory 270, a controller 280, and a microphone 290.

Referring to FIG. 2, the wireless communication circuit 220 may transmit and receive signals to and from any one of display devices according to embodiments of the present disclosure described above.

The remote control device 200 may include an RF circuit 221 capable of transmitting and receiving signals to and from the display device 100 according to the RF communication standard, and an IR circuit 223 capable of transmitting and receiving signals to and from the display device 100 according to the IR communication standard. In addition, the remote control device 200 may include a Bluetooth circuit 225 capable of transmitting and receiving signals to and from the display device 100 according to the Bluetooth communication standard. In addition, the remote control device 200 may include an NFC circuit 227 capable of transmitting and receiving signals to and from the display device 100 according to the NFC (near field communication) communication standard, and a WLAN circuit 229 capable of transmitting and receiving signals to and from the display device 100 according to the wireless LAN (WLAN) communication standard.

In addition, the remote control device 200 may transmit a signal containing information on the movement of the remote control device 200 to the display device 100 through the wireless communication circuit 220.

In addition, the remote control device 200 may receive a signal transmitted by the display device 100 through the RF circuit 221, and transmit a command regarding power on/off, channel change, volume adjustment, or the like to the display device 100 through the IR circuit 223 as necessary.

The user input interface 230 may include a keypad, a button, a touch pad, a touch screen, or the like. The user may input a command related to the display device 100 to the remote control device 200 by operating the user input interface 230. When the user input interface 230 includes a hard key button, the user may input a command related to the display device 100 to the remote control device 200 through a push operation of the hard key button. Details will be described with reference to FIG. 3.

Referring to FIG. 3, the remote control device 200 may include a plurality of buttons. The plurality of buttons may include a fingerprint recognition button 212, a power button 231, a home button 232, a live button 233, an external input button 234, a volume control button 235, a voice recognition button 236, a channel change button 237, an OK button 238, and a back-play button 239.

The fingerprint recognition button 212 may be a button for recognizing a user's fingerprint. In one embodiment, the fingerprint recognition button 212 may enable a push operation, and thus may receive a push operation and a fingerprint recognition operation.

The power button 231 may be a button for turning on/off the power of the display device 100.

The home button 232 may be a button for moving to the home screen of the display device 100.

The live button 233 may be a button for displaying a real-time broadcast program.

The external input button 234 may be a button for receiving an external input connected to the display device 100.

The volume control button 235 may be a button for adjusting the level of the volume output by the display device 100.

The voice recognition button 236 may be a button for receiving a user's voice and recognizing the received voice.

The channel change button 237 may be a button for receiving a broadcast signal of a specific broadcast channel.

The OK button 238 may be a button for selecting a specific function, and the back-play button 239 may be a button for returning to a previous screen.

A description will be given referring again to FIG. 2.

When the user input interface 230 includes a touch screen, the user may input a command related to the display device 100 to the remote control device 200 by touching a soft key of the touch screen. In addition, the user input interface 230 may include various types of input means that may be operated by a user, such as a scroll key or a jog key, and the present embodiment does not limit the scope of the present disclosure.

The sensor 240 may include a gyro sensor 241 or an acceleration sensor 243, and the gyro sensor 241 may sense information regarding the movement of the remote control device 200.

For example, the gyro sensor 241 may sense information about the operation of the remote control device 200 based on the x, y, and z axes, and the acceleration sensor 243 may sense information about the moving speed of the remote control device 200. Meanwhile, the remote control device 200 may further include a distance measuring sensor to sense the distance between the display device 100 and the display 180.

The output interface 250 may output an image or audio signal corresponding to the operation of the user input interface 230 or a signal transmitted from the display device 100.

The user may recognize whether the user input interface 230 is operated or whether the display device 100 is controlled through the output interface 250.

For example, the output interface 450 may include an LED 251 that emits light, a vibrator 253 that generates vibration, a speaker 255 that outputs sound, or a display 257 that outputs an image when the user input interface 230 is operated or a signal is transmitted and received to and from the display device 100 through the wireless communication circuit 220.

In addition, the power supply circuit 260 may supply power to the remote control device 200, and stop power supply when the remote control device 200 has not moved for a predetermined time to reduce power consumption.

The power supply circuit 260 may restart power supply when a predetermined key provided in the remote control device 200 is operated.

The memory 270 may store various types of programs and application data required for control or operation of the remote control device 200.

When the remote control device 200 transmits and receives signals wirelessly through the display device 100 and the RF circuit 221, the remote control device 200 and the display device 100 transmit and receive signals through a predetermined frequency band.

The controller 280 of the remote control device 200 may store and refer to information on a frequency band capable of wirelessly transmitting and receiving signals to and from the display device 100 paired with the remote control device 200 in the memory 270.

The controller 280 may control all matters related to the control of the remote control device 200. The controller 280 may transmit a signal corresponding to a predetermined key operation of the user input interface 230 or a signal corresponding to the movement of the remote control device 200 sensed by the sensor 240 through the wireless communication circuit 220.

Also, the microphone 290 of the remote control device 200 may obtain a speech.

A plurality of microphones 290 may be provided.

Next, a description will be given referring to FIG. 4.

Figure 4:
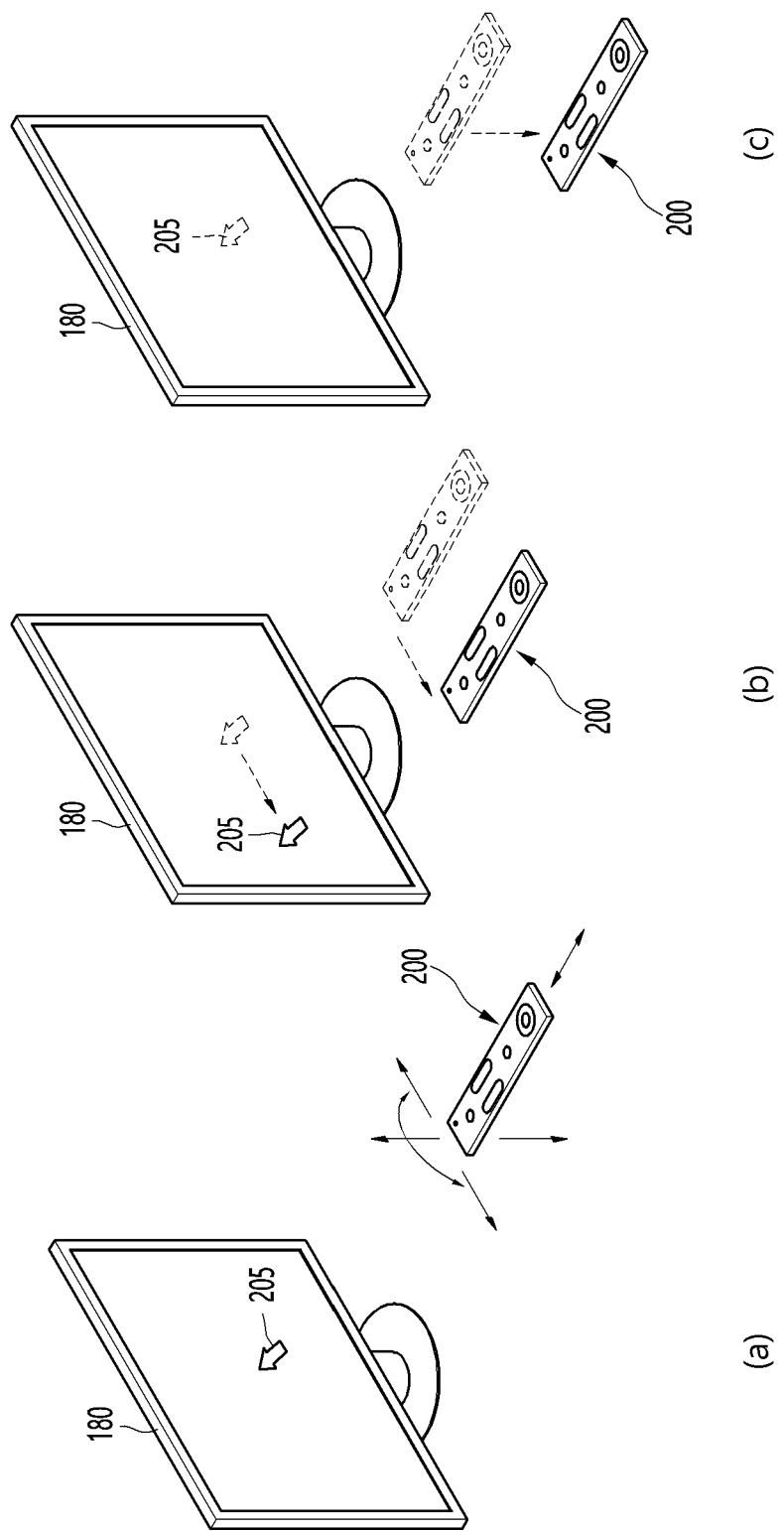
FIG. 4 shows an example of using a remote control device according to an embodiment of the present disclosure.

FIG. 4 shows an example of using a remote control device according to an embodiment of the present disclosure.

In FIG. 4, (a) illustrates that a pointer 205 corresponding to the remote control device 200 is displayed on the display 180.

The user may move or rotate the remote control device 200 up, down, left and right. The pointer 205 displayed on the display 180 of the display device 100 may correspond to the movement of the remote control device 200. As shown in the drawings, the pointer 205 is moved and displayed according to movement of the remote control device 200 in a 3D space, so the remote control device 200 may be called a space remote control device.

In (b) of FIG. 4, it is illustrated that that when the user moves the remote control device 200 to the left, the pointer 205 displayed on the display 180 of the display device 100 moves to the left correspondingly.

Information on the movement of the remote control device 200 detected through a sensor of the remote control device 200 is transmitted to the display device 100. The display device 100 may calculate the coordinates of the pointer 205 based on information on the movement of the remote control device 200. The display device 100 may display the pointer 205 to correspond to the calculated coordinates.

In (c) of FIG. 4, it is illustrated that a user moves the remote control device 200 away from the display 180 while pressing a specific button in the remote control device 200. Accordingly, a selected area in the display 180 corresponding to the pointer 205 may be zoomed in and displayed enlarged.

Conversely, when the user moves the remote control device 200 to be close to the display 180, the selected area in the display 180 corresponding to the pointer 205 may be zoomed out and displayed reduced.

On the other hand, when the remote control device 200 moves away from the display 180, the selected area may be zoomed out, and when the remote control device 200 moves to be close to the display 180, the selected area may be zoomed in.

Also, in a state in which a specific button in the remote control device 200 is being pressed, recognition of up, down, left, or right movements may be excluded. That is, when the remote control device 200 moves away from or close to the display 180, the up, down, left, or right movements are not recognized, and only the forward and backward movements may be recognized. In a state in which a specific button in the remote control device 200 is not being pressed, only the pointer 205 moves according to the up, down, left, or right movements of the remote control device 200.

Meanwhile, the movement speed or the movement direction of the pointer 205 may correspond to the movement speed or the movement direction of the remote control device 200.

Meanwhile, in the present specification, a pointer refers to an object displayed on the display 180 in response to an operation of the remote control device 200. Accordingly, objects of various shapes other than the arrow shape shown in the drawings are possible as the pointer 205. For example, the object may be a concept including a dot, a cursor, a prompt, a thick outline, and the like. In addition, the pointer 205 may be displayed corresponding to any one point among points on a horizontal axis and a vertical axis on the display 180, and may also be displayed corresponding to a plurality of points such as a line and a surface.

Figure 5:
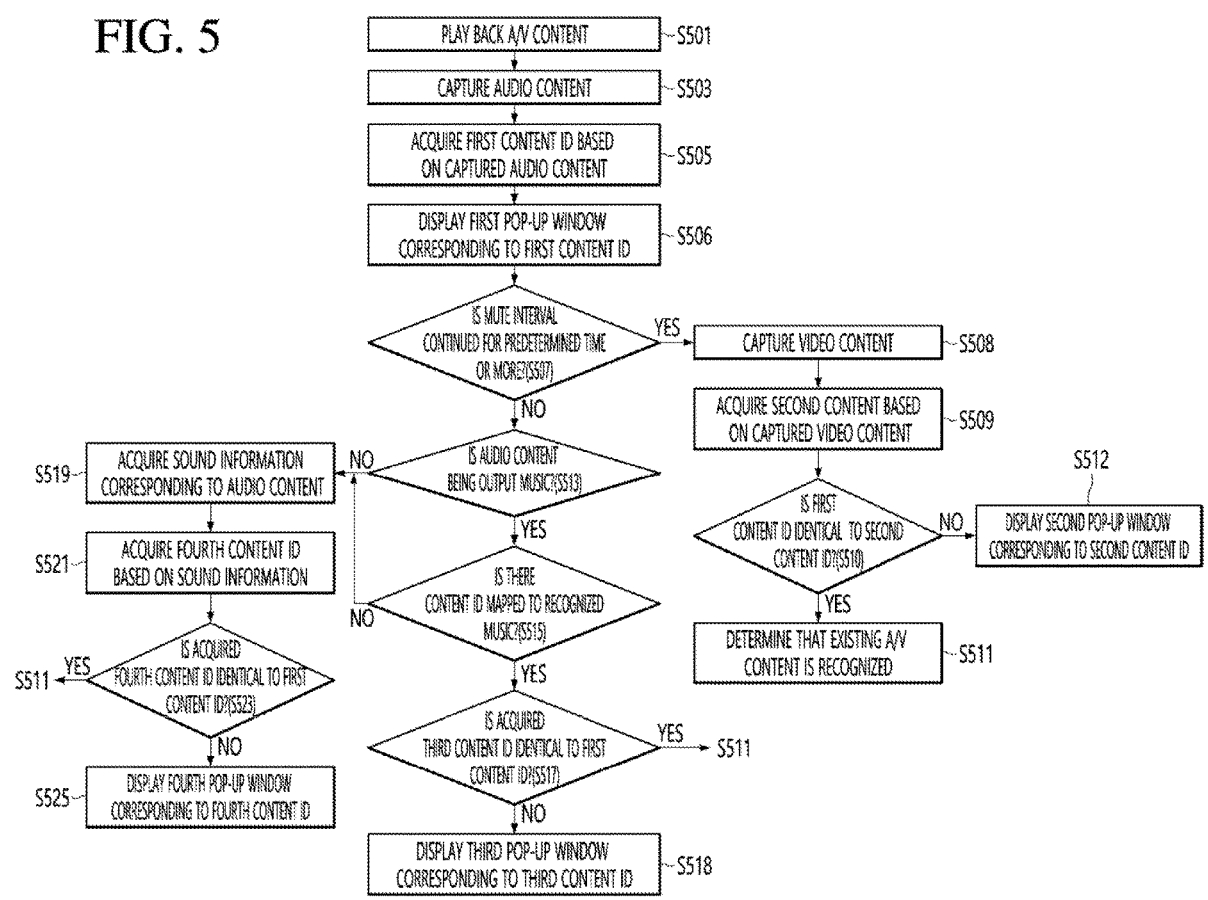
FIG. 5 is a flowchart for describing a method of recognizing content in a display device according to an embodiment of the present disclosure.

FIG. 5 is a flowchart for describing a method of recognizing content in a display device according to an embodiment of the present disclosure.

Hereinafter, it is assumed that, when one A/V content is recognized, one pop-up window (a type of enhanced service) may be displayed until playback of the recognized A/V content is ended. This is called a nudge policy.

Referring to FIG. 5, the controller 170 of the display device 100 may play back audio-video content (hereinafter, referred to as A/V content, or Audio/Video content) (S501).

The controller 170 may play back the A/V content on the display 180.

The controller 170 may capture audio content (S503), and acquire a first content ID that is an identifier of the A/V content based on the captured audio content (S505).

The controller 170 may basically use an audio capture method to recognize A/V content. An audio-based ACR method has better cost and efficiency than a video-based ACR method.

The controller 170 may capture audio content output to the speaker 185.

The controller 170 may capture the audio content and recognize A/V content based on the captured audio content.

The controller 170 may generate an audio packet including audio feature information from the captured audio content, and transmit the generated audio packet to an audio ACR (Auto Content Recognition) server through the network interface 133.

The controller 170 may receive the first content ID (IDentifier) for identifying the A/V content from the audio content recognition server, and recognize the A/V content based on the received first content ID.

When a content name matching the first content ID is stored in the memory 140, the controller 170 may determine that the A/V content has been recognized.

The controller 170 may periodically capture audio content.

Recognizing A/V content may indicate recognizing what the title or name of the A/V content is.

The controller 170 may display a first pop-up window corresponding to the first content ID (S506).

The controller 170 may output an enhanced service according to the recognition of the A/V content.

The enhanced service may have the form of service information, metadata, supplementary data, compiled executable files, web applications, HTML (Hypertext Markup Language) documents, XML documents, CSS (cascading style sheet) documents, audio files, video files, ATSC 2.0 content, an address such as a Uniform Resource Locater (URL), or the like.

The enhanced service may include one or more of detailed information about A/V content being played back, episode information, related genre information, and product information.

In another embodiment, the enhanced service may include service information which is unrelated to A/V content. That is, the enhanced service may be any one of guidance service for a new function of the display device 100 and a sports result notification, which are unrelated to the A/V content being played back.

The enhanced service may be displayed on the display 180 at a predetermined time in the form of a pop-up window.

The controller 170 may receive the enhanced service from an enhanced service providing server, and display the received enhanced service on the display 180.

The controller 170 may further receive an access address for accessing the enhanced service providing server from the ACR server, in addition to the content identifier. The controller 170 may access the enhanced service providing server through the received access address to receive the enhanced service from the enhanced service providing server.

Thereafter, when the A/V content is not recognized based on audio content, the controller 170 may determine whether a mute interval is continued for a predetermined time or more (S507).

The predetermined time may be 10 seconds, but is only an example.

The mute interval may be generated when a broadcaster logo screen is played back or there is no speaking of a person.

When it is determined that the mute interval is continued for a predetermined time or more, the controller 170 may capture video content (S508), and acquire a second content ID of the A/V content based on the captured video content (S509).

When the audio content is not output to the speaker 185 for a predetermined time, the controller 170 may capture the video content of the A/V content.

The controller 170 may acquire the second content ID of the A/V content based on the captured video content, and recognize the A/V content based on the acquired second content ID.

The controller 170 may determine whether the acquired second content ID is identical to a previously-acquired first content ID (S510).

When the controller 170 determines that the acquired second content ID is identical to the previously-acquired first content ID, the controller 170 may determine that the A/V content which has being played back has been recognized (S511).

When the second content ID is identical to the first content ID, the controller 170 may maintain a content ID without resetting the content ID. That is, the controller 170 may determine that the A/V content has not been changed.

Accordingly, the controller 170 may prevent a pop-up window other than the first pop-up window from being displayed until the playback of the A/V content is ended according to the nudge policy.

As described above, according to the embodiment of the present disclosure, it is possible to follow the nudge policy well by using the ACR method through a video even when the mute interval is continued for a predetermined time.

Accordingly, when viewing A/V content, a user may not feel inconvenience of viewing, which is caused by several exposes of a pop-up window.

Meanwhile, the playback end time point of the A/V content may be stored in the memory 140 or determined based on EPG (Electric Program Guide) information received from an external server.

When it is determined that the acquired second content ID is not identical to the previously-acquired first content ID, the controller 170 may display a second pop-up window corresponding to the second content ID (S512).

When the acquired second content ID is not identical to the previously-acquired first content ID, the controller 170 may reset the content ID and display the second pop-up window corresponding to the second content ID on the display 180.

That is, when the acquired second content ID is not identical to the previously-acquired first content ID, the controller 170 may determine that the playback of existing A/V content is ended and the playback of new A/V content is started.

Meanwhile, when it is determined that the mute interval is not last continued for a predetermined time or more, the controller 170 may determine whether the audio content being output is music (S513).

The controller 170 may determine whether the audio content is music based on the waveform of the audio content.

When the waveform of the audio content repeats a specific waveform pattern, the controller 170 may determine that the audio content is music.

When it is determined that the audio content being output is music, the controller 170 may determine whether there is a content ID mapped to the recognized music (S515).

When it is determined that the audio content is music, the controller 170 may capture the audio content and transmit audio feature information corresponding to the captured audio content to a music server through the network interface 133.

The music server may acquire music information matching the audio feature information corresponding to the audio content determined as music, and transmit the acquired music information to the display device 100.

The music information may include one or more of a title of music, a singer of the music, and original sound track (OST) information.

The OST information may include a title of music and a title of a soap opera or a movie.

The controller 170 may acquire an identifier of the A/V content by using the music information. In particular, the controller 170 may acquire an identifier of the A/V content by using OST information included in the music information.

When the identifier of A/V content associated with the OST information is identical to the identifier of A/V content recognized immediately before ACR, the controller 170 does not reset the identifier of A/V content, and may maintain the existing identifier of A/V content Maintaining the existing identifier of A/V content may indicate that the content being played back is recognized as the existing A/V content.

When a third content ID mapped to the recognized music is acquired, the controller 170 may determine whether the acquired content ID is identical to the first content ID (S517).

When the acquired third content ID is identical to the first content ID, the controller 170 may determine that the A/V content has being played back is recognized according to S511 (S511).

When the acquired third content ID is not identical to the first content ID, the controller 170 may display a third pop-up window corresponding to the third content ID acquired according to S512 (S512).

The third content ID may be identical to or different from the second content ID.

When it is determined that the audio content being output is not music, the controller 170 may acquire sound information mapped to the audio content (S519).

When it is determined that the audio content being output is not music, the controller 170 may capture the audio content and transmit audio packets corresponding to the captured audio content to a sound recognizer server through the network interface 133.

The controller 170 may receive sound information mapped to audio content from the sound recognizer server.

The sound information may include information about an object emitting a sound, such as an animal sound or a vehicle sound.

The controller 170 may acquire a fourth content ID based on the acquired sound information (S521), and determine whether the acquired fourth content ID is identical to the first content ID (S523).

The controller 170 may determine whether the content identifier mapped to the sound information is stored in the memory 140.

When the content identifier mapped to the sound information is stored in the memory 140, the controller 170 may determine that A/V content has been recognized.

When the acquired fourth content ID is identical to the first content ID, the controller 170 may perform step S511.

When the acquired fourth content ID is not identical to the first content ID, the controller 170 may display a fourth pop-up window corresponding to the acquired fourth content ID (S525).

The fourth content ID may be identical to or different from the second content ID or the third content ID.

Figure 6:
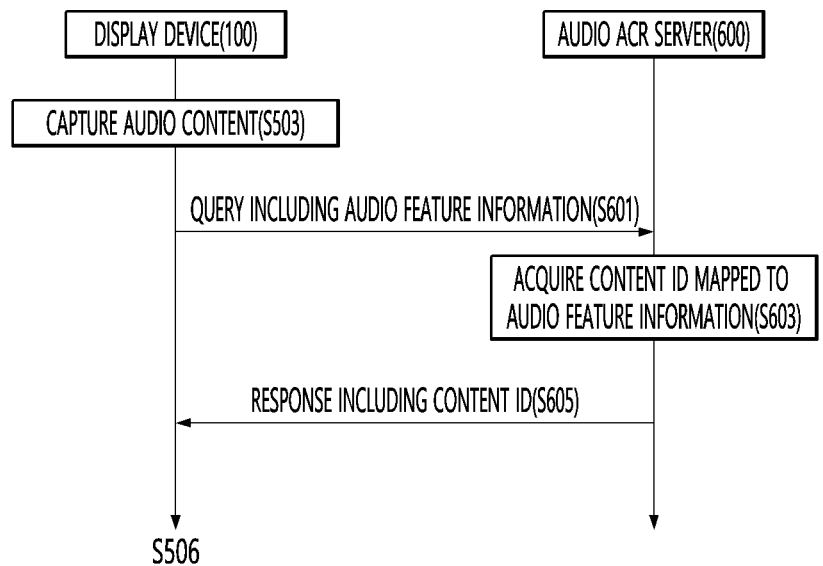
FIG. 6 is a flowchart for describing a method of recognizing content in a content recognition system according to an embodiment of the present disclosure.

FIG. 6 is a flowchart for describing a method of recognizing content in a content recognition system according to an embodiment of the present disclosure.

A content recognition system may include a display device 100 and an audio ACR server 600.

In particular, FIG. 6 is a view for describing step S505 of FIG. 5 in detail.

The display device 100 may capture the audio content (S503), and transmit a query including feature information extracted from the captured audio content to the audio ACR server 600 (S601).

The display device 100 may extract audio feature information from the captured audio content and transmit a query including the extracted audio feature information to the audio ACR server 600.

The audio ACR server 600 may acquire a content ID mapped to the received audio feature information (S803), and transmit a response including the acquired content ID to the display device 100 (S805).

The audio ACR server 600 may include a database for storing a plurality of content identifiers to respectively correspond to a plurality of audio features.

The audio ACR server 600 may extract a content identifier corresponding to the audio feature received from the database, and transmit the extracted content identifier to the display device 100 in response to a query.

The display device 100 may recognize A/V content based on the content ID included in the received response, and output an enhanced service of the recognized A/V content.

Figure 7:
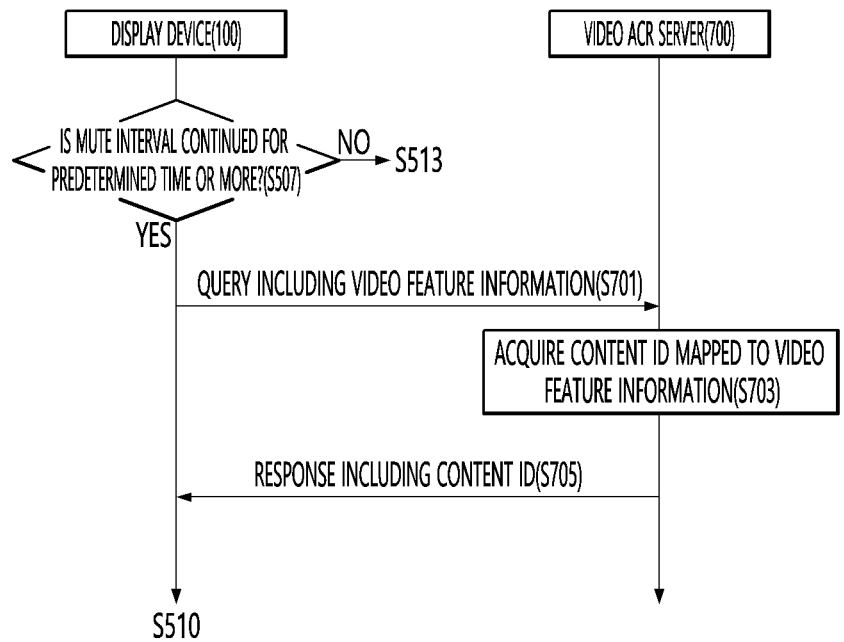
FIG. 7 is a flowchart for describing a method of recognizing content in a content recognition system according to an embodiment of the present disclosure.

FIG. 7 is a flowchart for describing a method of recognizing content in a content recognition system according to an embodiment of the present disclosure.

The content recognition system may include a display device 100 and a video ACR server 700.

In particular, FIG. 7 is a view for describing step S509 of FIG. 5 in detail.

The display device 100 may capture video content, and transmit a query including video feature information extracted from the captured video content to the video ACR server 700 when a mute interval is continued for a predetermined time or more (S701).

The display device 100 may extract the video feature information from the captured video content, and transmit a query including the extracted video feature information to the video ACR server 700.

The video ACR server 700 may acquire a content ID mapped to the received video feature information (S703), and transmit a response including the acquired content ID to the display device 100 (S705).

The video ACR server 700 may include a database for storing a plurality of content identifiers to respectively correspond to a plurality of video features.

The video ACR server 700 may extract a content identifier corresponding to the video feature received from the database, and transmit the extracted content identifier to the display device 100 in response to a query.

The display device 100 may recognize A/V content based on the content ID included in the received response, and output an enhanced service of the recognized A/V content.

As described above, according to the embodiment of the present disclosure, it is possible to recognize the A/V content through the ACR method through video capture even if there is a mute interval when playing A/V content, thus making it possible to recognize the A/V content in any situation.

Figure 8:
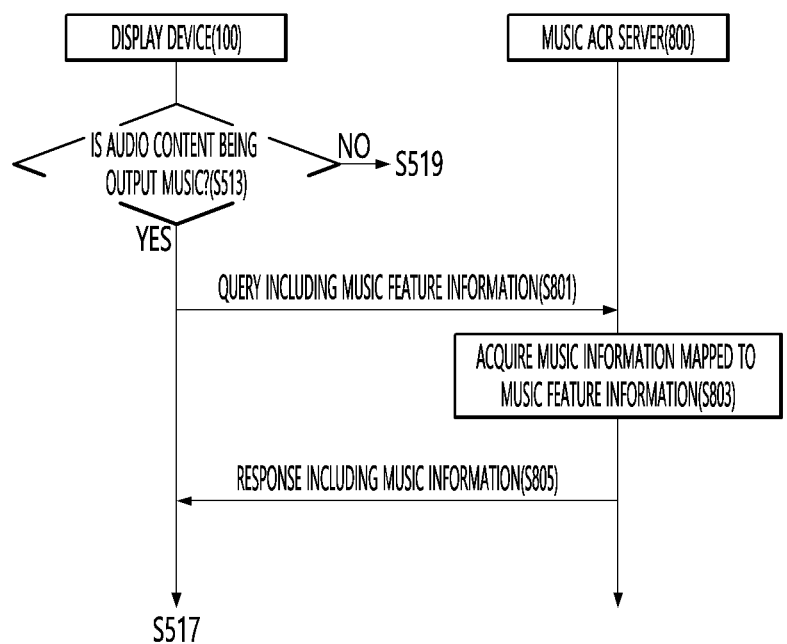
FIG. 8 is a flowchart for describing a method of operating content a content recognition system according to an embodiment of the present disclosure.

FIG. 8 is a flowchart for describing a method of operating content a content recognition system according to an embodiment of the present disclosure.

The content recognition system may include a display device 100 and a music ACR server 800.

In particular, FIG. 8 is a view for describing step S515 of FIG. 5 in detail.

When it is determined that audio content being output is music (S513), the display device 100 may capture the audio content and transmit a query including music feature information extracted from the captured audio content to the music server ACR 800 (S801).

The display device 100 may extract a waveform of the captured audio content and determine whether the audio content is music based on the extracted waveform. When it is determined that the audio content is music, the display device 100 may transmit a query including music feature information including a repeated specific waveform pattern to the music server 800.

The music server 800 may acquire music information mapped to the received music feature information (S803), and transmit a response including the acquired music information to the display device 100 (S805).

The music server 800 may include a database for storing a plurality of pieces of music information to respectively correspond to a plurality of music features.

The music server 800 may extract music information corresponding to music features from the database, and transmit the extracted music information to the display device 100 in response to a query.

The display device 100 may determine whether a content identifier corresponding to the music information included in the received response is stored.

Figure 9:
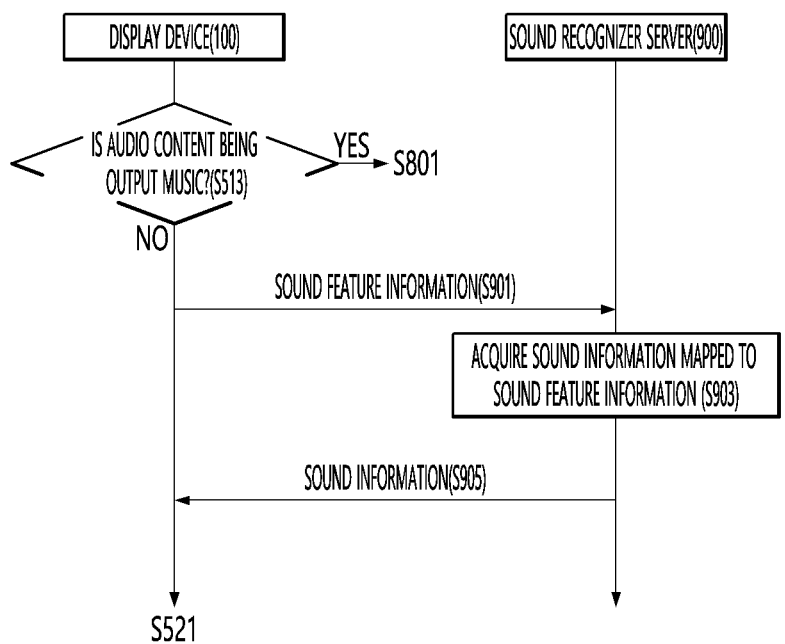
FIG. 9 is a flowchart for describing a method of operating content a content recognition system according to an embodiment of the present disclosure.

FIG. 9 is a flowchart for describing a method of operating content a content recognition system according to an embodiment of the present disclosure.

The content recognition system may include a display device 100 and a sound recognizer server 900.

In particular, FIG. 9 is a view for describing step S519 of FIG. 5 in detail.

When the audio content being output is not determined to be music (S513), the display device 100 may capture audio content and transmit a query including sound feature information extracted from the captured audio content to the sound recognizer server 900 (S901).

The display device 100 may extract sound feature information from the captured audio content and transmit a query including the extracted sound feature information to the sound recognizer server 900.

The sound recognizer server 900 may acquire sound information mapped to the received sound feature information (S903), and transmit a response including the acquired sound information to the display device 100 (S905).

The sound recognizer server 800 may include a database for storing a plurality of sound information to respectively correspond to a plurality of sound features.

The sound server 800 may extract sound information corresponding to sound features from the database, and transmit the extracted sound information to the display device 100 in response to a query.

The display device 100 may recognize A/V content based on the sound information included in the received response, and output an enhanced service of the recognized A/V content.

As described above, according to the embodiment of the present disclosure, it is possible to obtain sound information and recognize the A/V content without capturing the video of the A/V content, even when the audio content being output is not music.

Figure 10:
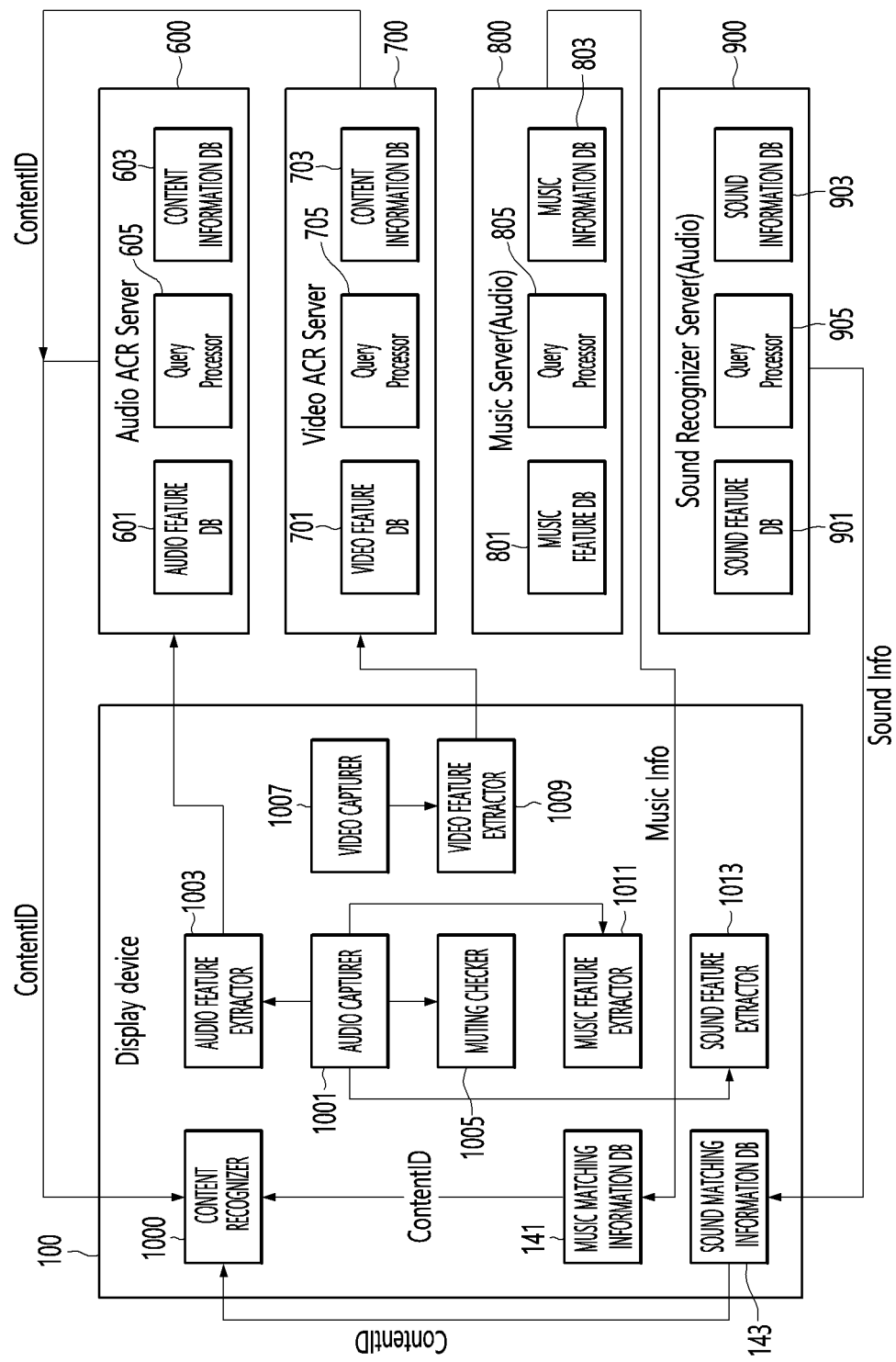
FIG. 10 is a diagram for describing a configuration of a content recognition system according to an embodiment of the present disclosure.

FIG. 10 is a diagram for describing a configuration of a content recognition system according to an embodiment of the present disclosure.

Referring to FIG. 10, a content recognition system may include a display device 100, an audio ACR server 600, a video ACR server 700, a music server 800, and a sound recognizer server 900.

The audio ACR server 600, the video ACR server 700, the music server 800, and the sound recognizer server 900 may be provided separately or as one server system.

The display device 100 may communicate with each server through the network interface 133.

The display device 100 may include a content recognizer 1000, an audio capturer 1001, an audio feature extractor 1003, a muting checker 1005, a video capturer 1007, a video feature extractor 1009, and a music feature extractor 1011, a sound feature extractor 1013, a music matching information DB 141, and a sound matching information DB 143.

The content recognizer 1000, the audio capturer 1001, the audio feature extractor 1003, the muting checker 1005, the video capturer 1007, the video feature extractor 1009, the music feature extractor 1011, the sound feature extractor 1013 may be components included in the controller 170 of FIG. 1 or a separately-provided processor.

The music matching information DB 141 and the sound matching information DB 143 may be components included in the memory 140 of FIG. 1 or a separately-provided database.

The content recognizer 1000 may recognize A/V content being played back on the display 180 using a content ID (content identifier) received from the ACR server.

The content recognizer 1000 may acquire the name or title of the A/V content by using the content identifier.

The audio capturer 1001 may capture audio content included in the A/V content.

The audio capturer 1001 may periodically capture audio content.

The audio feature extractor 1003 may extract audio feature information from a sample of the captured audio content. The audio feature extractor 1003 may transmit the audio feature information extracted through the network interface 133 to the audio ACR server 600.

The muting checker 1005 may check whether audio is not output to the speaker 185 for a predetermined time. The predetermined time may be 10 seconds, but is only an example.

The video capturer 1007 may capture video content included in the A/V content.

The video feature extractor 1009 may extract video feature information from some frames of the captured video content. The video feature extractor 1009 may transmit the extracted video feature information to the video ACR server 700 through the network interface 133.

The music feature extractor 1011 may determine whether the audio content is music by extracting a waveform of the audio content. The music feature extractor 1011 may determine that the audio content is music when a specific repeated waveform pattern is detected from the waveform of the audio content.

The music feature extractor 1011 may transmit the music feature information including the specific repeated waveform pattern to the music server 800 through the network interface 133.

The sound feature extractor 1013 may extract sound feature information from the captured audio content. The sound feature information may include information indicating features of an object, such as an animal sound or an object sound.

The sound feature extractor 1013 may transmit the extracted sound feature information to the sound recognizer server 900 through the network interface 133.

The music matching information DB 141 may store a content identifier matching music information.

The sound matching information DB 143 may store a content identifier matching sound information.

The audio ACR server 600 may include an audio feature DB 601, a content information DB 603, and a query processor 605.

The audio feature DB 601 may store a plurality of audio features.

The content information DB 603 may store a plurality of content identifiers respectively corresponding to the plurality of audio features.

The query processor 605 may search for an audio feature matching the audio feature information received from the audio feature DB 601 and extract a content identifier corresponding to the retrieved audio feature found from the content information DB 605.

The query processor 605 may transmit the extracted content identifier to the content recognizer 1000 of the display device 100.

The video ACR server 700 may include a video feature DB 701, a content information DB 703, and a query processor 705.

The video feature DB 701 may store a plurality of video features.

The content information DB 703 may store a plurality of content identifiers respectively corresponding to the plurality of video features.

The query processor 705 may search for a video feature matching the video feature information received from the video feature DB 701, and extract a content identifier corresponding to the video feature found from the content information DB 703.

The query processor 705 may transmit the extracted content identifier to the content recognizer 1000 of the display device 100.

The music server 800 may include a music feature DB 801, a music information DB 803, and a query processor 805.

The music feature DB 801 may store a plurality of music features.

The music information DB 803 may store pieces of music information respectively corresponding to the plurality of music features. The music information may include one or more of a title, a singer, and OST information of music.

The query processor 805 may search for a music feature matching the music feature information received from the music feature DB 801, and extract music information corresponding to the music feature found from the music information DB 803.

The query processor 805 may transmit the extracted music information to the music matching information DB 141 of the display device 100.

The sound recognizer server 900 may include a sound feature DB 901, a sound information DB 903, and a query processor 905.

The sound feature DB 901 may store a plurality of sound features.

The sound information DB 903 may store pieces of sound information respectively corresponding to the plurality of sound features.

The query processor 805 may search for a music feature matching the music feature information received from the music feature DB 801, and extract music information corresponding to the music feature found from the music information DB 803.

The query processor 805 may transmit the extracted music information to the music matching information DB 141 of the display device 100.

According to an embodiment of the present disclosure, the above-described method may be implemented with codes readable by a processor on a medium in which a program is recorded. Examples of the medium readable by the processor include a ROM (Read Only Memory), a Random Access Memory (RAM), a CD-ROM, a magnetic tape, a floppy disk, an optical data storage device, and the like.

The above-described present disclosure is not limited to the configuration and method of the above-described embodiments, but the embodiments may be configured by selectively combining all or part of each embodiment such that various modifications can be made.

What is claimed is:

1. A display device comprising:
a display;
a network interface configured to communicate with an external server; and
a controller configured to:
capture audio content during playback of Audio/Video (A/V) content,
acquire a first content identifier based on the captured audio content,
display a first pop-up window corresponding to the acquired first content identifier on the display,
based on a mute interval being continued for a predetermined time, capture video content and acquire a second content identifier based on the captured video content, and
based on the acquired second content identifier being not identical to the first content identifier, display a second pop-up window corresponding to the second content identifier on the display.

2. The display device of claim 1, wherein the controller is configured to prevent the second pop-up window from being displayed when the acquired second content identifier is identical to the first content identifier.

3. The display device of claim 1, wherein the controller is configured to determine whether the audio content is music based on a waveform of the audio content when a mute interval is not continued for the predetermined time.

4. The display device of claim 3, wherein the controller is configured to transmit audio feature information of the audio content to the external server through the network interface when it is determined that the audio content is the music, receive music information from the external server, and determine whether a third content identifier mapped to the received music information exists.

5. The display device of claim 4, wherein the controller is configured to:
determine whether the third content identifier is identical to the first content identifier when there is the third content identifier mapped to the received music information, and
display a third pop-up window corresponding to the third content identifier when the third content identifier is not identical to the first content identifier.

6. The display device of claim 4, wherein the controller is configured to extract sound feature information from the audio content, transmit the extracted sound feature information to the external server, and receive sound information from the external server when the third content identifier mapped to the received music information does not exist.

7. The display device of claim 6, wherein the controller is configured to acquire a fourth content identifier based on the sound information and determine whether the fourth content identifier is identical to the first content identifier.

8. The display device of claim 7, wherein the controller is configured to display a fourth pop-up window corresponding to the fourth content identifier when the acquired fourth content identifier is not identical to the first content identifier.

9. The display device of claim 1, wherein the controller is configured to transmit audio feature information extracted from the audio content to an audio ACR server and receive the first content identifier from the audio ACR server.

10. The display device of claim 1, wherein the controller is configured to transmit video feature information extracted from the video content to a video ACR server, and receive the first content identifier from the video ACR server.

11. The display device of claim 1, wherein the controller is configured to prevent a pop-up window other than the first pop-up window from being displayed until playback of the A/V content is ended when the acquired second content identifier is identical to the first content identifier.

12. The display device of claim 1, wherein the first pop-up window includes an enhanced service related to the A/V content.

13. The display device of claim 1, wherein the first pop-up window includes an enhanced service unrelated to the A/V content.

14. The display device of claim 1, wherein the controller is configured to receive information about the first pop-up window and the second pop-up window from an enhanced service providing server.

15. A method of recognizing content in a display device, comprising:
capturing audio content during playback of Audio/Video (A/V) content;
acquiring a first content identifier based on the captured audio content;
displaying a first pop-up window corresponding to the acquired first content identifier on the display;
based on a mute interval being continued for a predetermined time, capturing video content and acquiring a second content identifier based on the captured video content; and
displaying a second pop-up window corresponding to the second content identifier on the display, based on the acquired second content identifier being not identical to the first content identifier.

* * * * *